United States Patent [19]

Porter et al.

[11] Patent Number: 5,441,129
[45] Date of Patent: Aug. 15, 1995

[54] PRECISION LINEAR MECHANICAL LOCK

[75] Inventors: Clyde R. Porter, Los Angeles; Calvin R. Stringer, Saugus, both of Calif.

[73] Assignee: P. L. Porter Co., Woodland Hills, Calif.

[21] Appl. No.: 195,933

[22] Filed: Feb. 14, 1994

Related U.S. Application Data

[63] Continuation-in-part of Ser. No. 74,041, Jun. 8, 1993.
[51] Int. Cl.$^6$ .............................................. B65H 59/10
[52] U.S. Cl. ................................... 188/67; 188/77 W
[58] Field of Search ................ 188/67, 265, 77 W; 74/531; 248/354.1, 354.4, 354.5, 410, 414; 267/154, 155; 297/374, 375

[56] References Cited

U.S. PATENT DOCUMENTS

| | | | |
|---|---|---|---|
| 3,874,480 | 4/1975 | Porter et al. | 188/67 |
| 3,893,730 | 7/1975 | Homier et al. | 188/67 |
| 4,387,926 | 6/1983 | Van Eerden et al. | 188/67 |
| 4,411,339 | 10/1983 | Porter | 188/67 |
| 4,425,987 | 1/1984 | Porter | 188/67 |
| 4,457,406 | 7/1984 | Porter | 188/67 |
| 4,577,730 | 3/1986 | Porter | 297/375 |
| 5,150,771 | 9/1992 | Porter | 188/67 |
| 5,219,045 | 6/1993 | Porter et al. | 188/67 |

FOREIGN PATENT DOCUMENTS 1034644 6/1966 United Kingdom ............. 248/354.1

Primary Examiner—Robert J. Oberleitner
Assistant Examiner—Chris Schwartz
Attorney, Agent, or Firm—Beehler & Pavitt

[57] ABSTRACT

A mechanical lock of the type where a rod is normally locked for axial movement through a lock housing by a spring tightly wound about the rod and axially fixed to the housing, the rod being released by partially unwinding the spring. The lock housing is configured to reduce the number of parts in the lock and is easily adjustable during assembly to eliminate axial free play of the locking spring. The lock is assembled without welding of the components to permit use of dissimilar materials in the lock housing selected for strength and weight characteristics and plated or painted components.

42 Claims, 5 Drawing Sheets

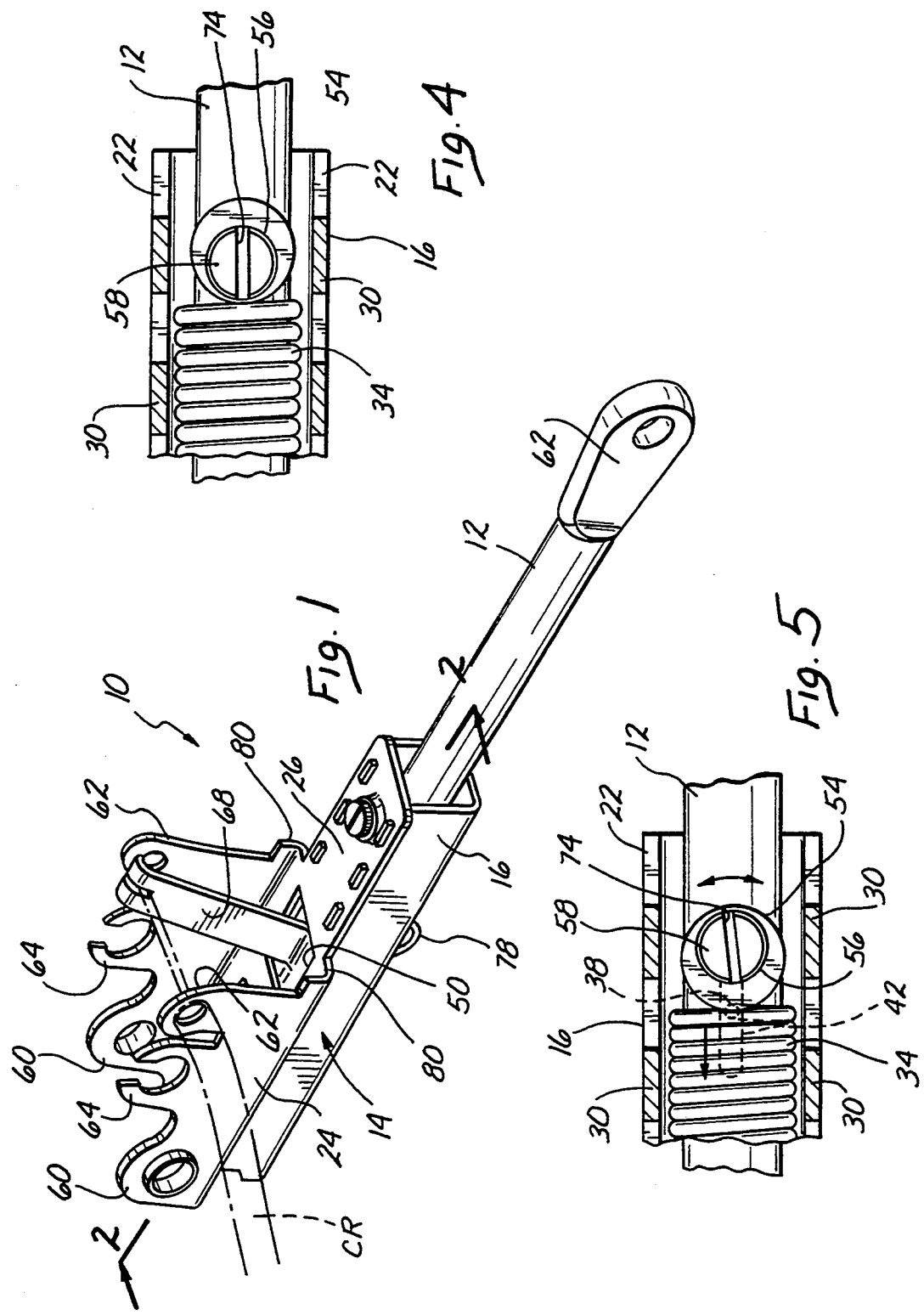

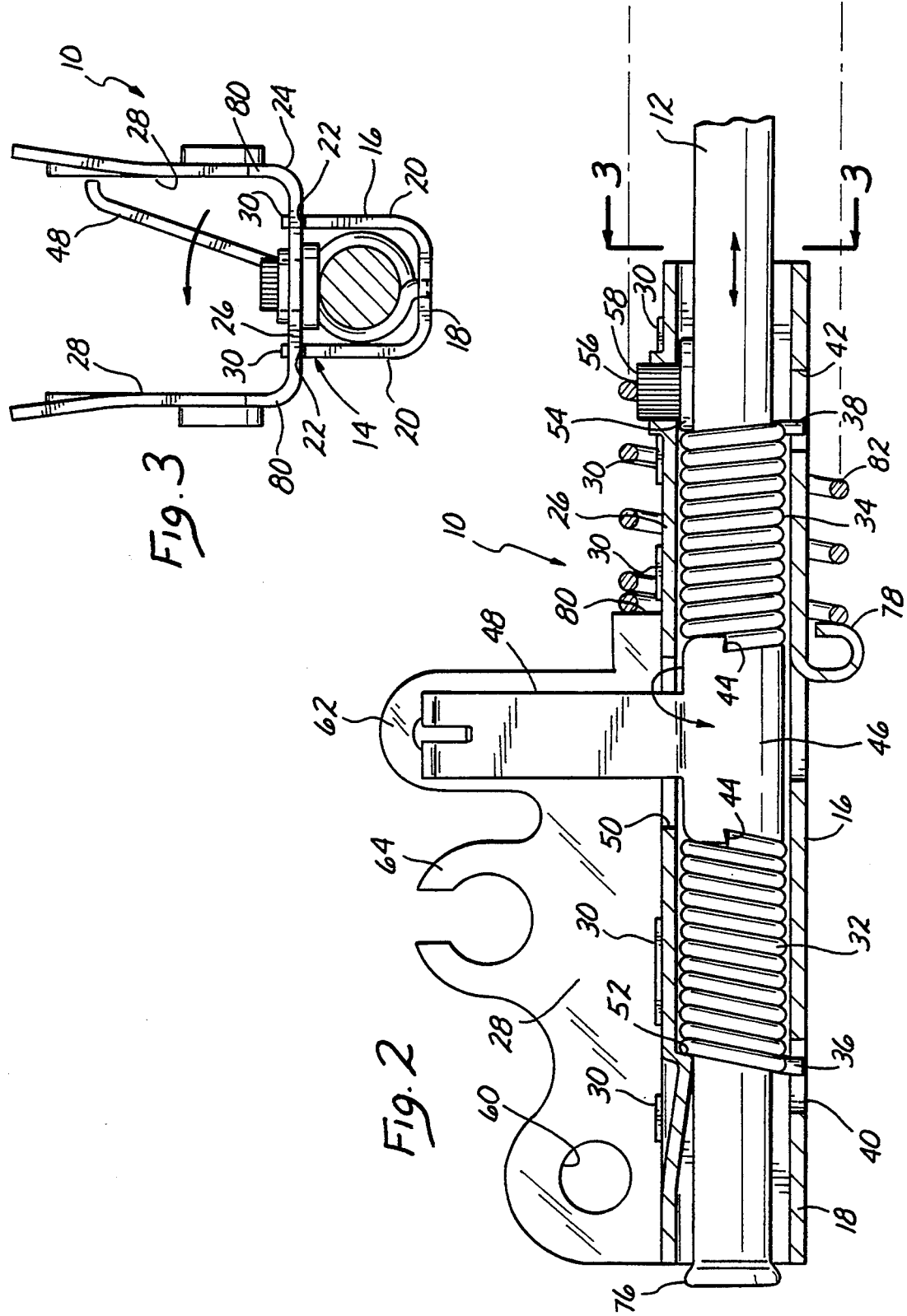

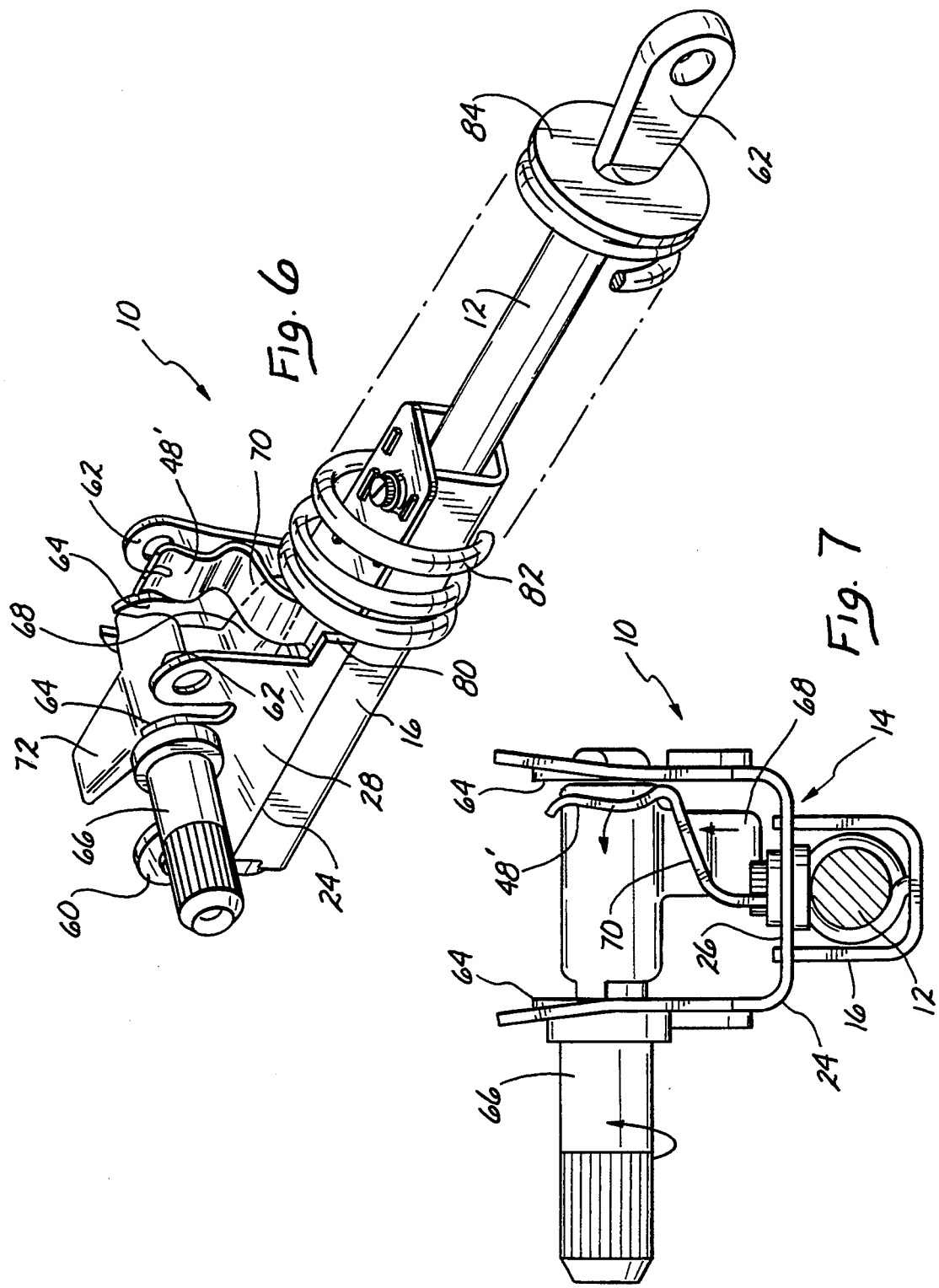

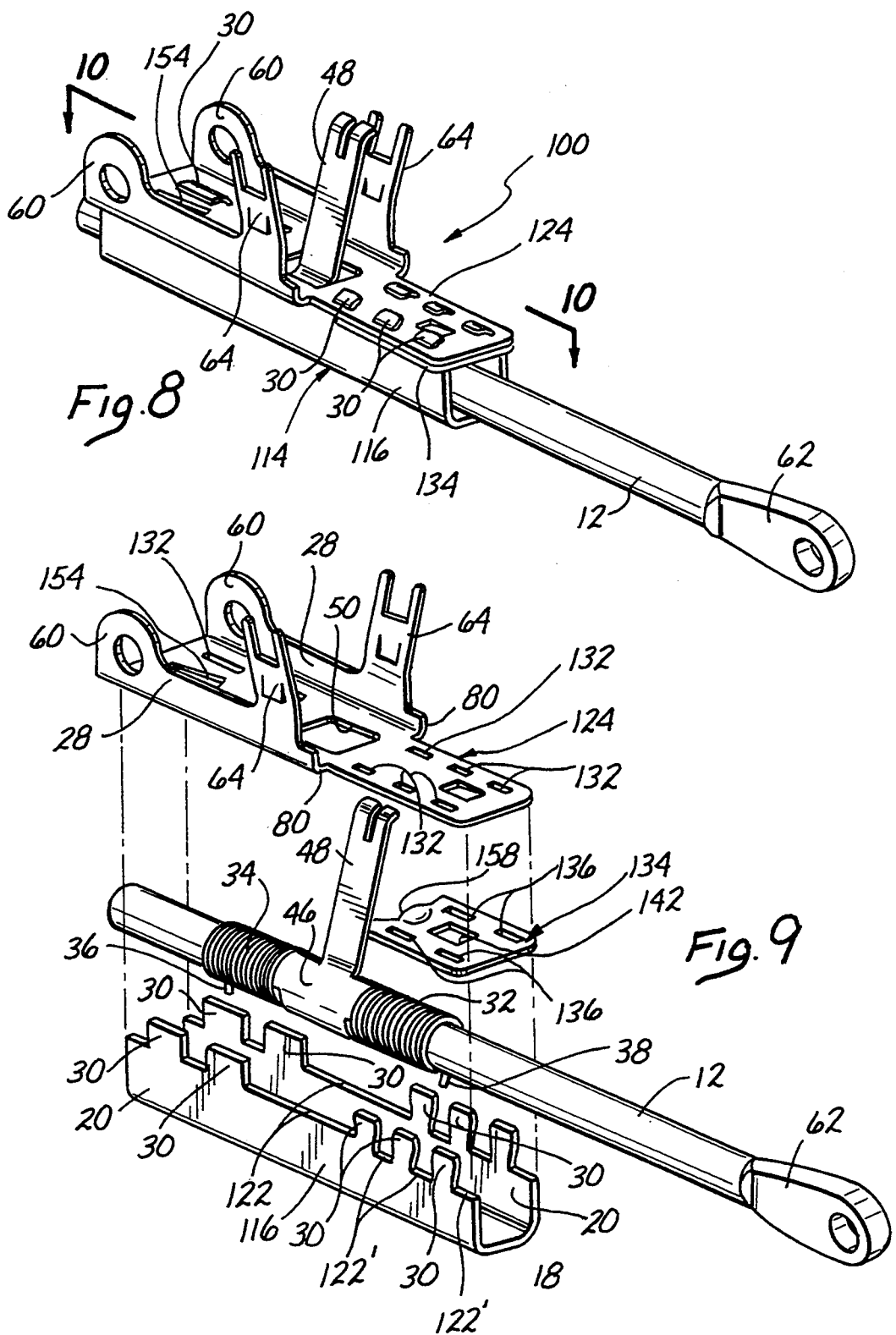

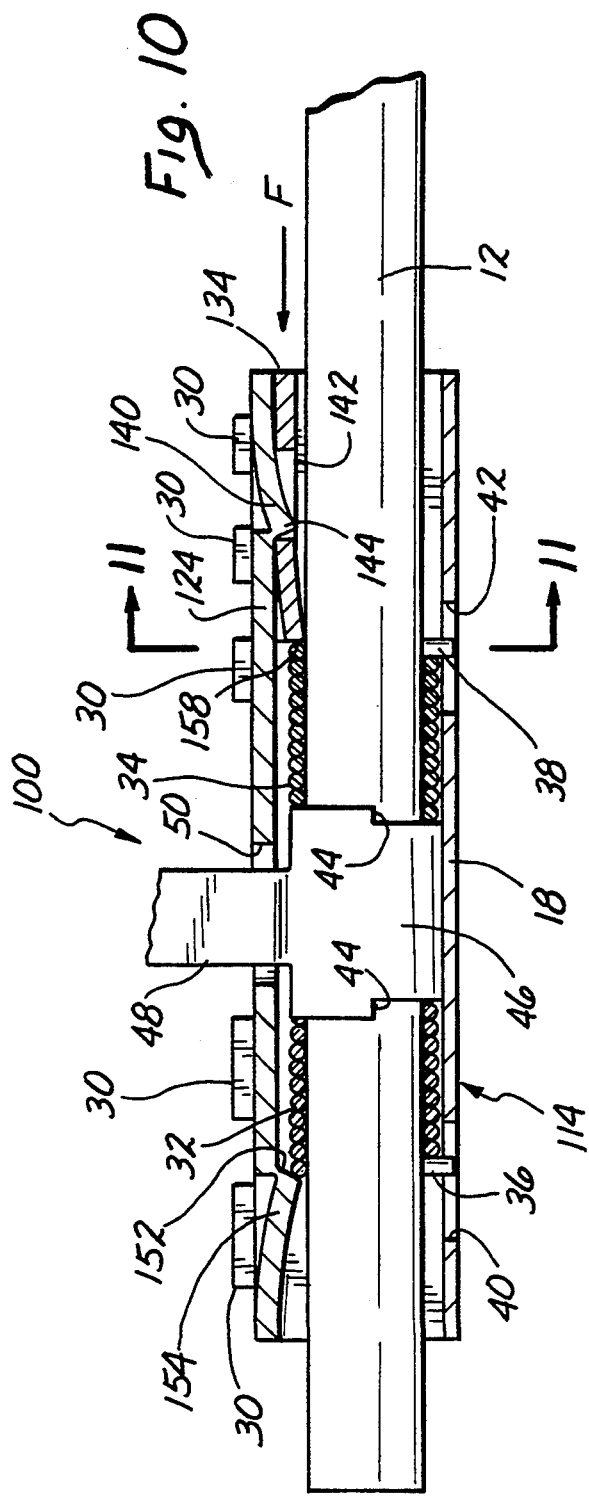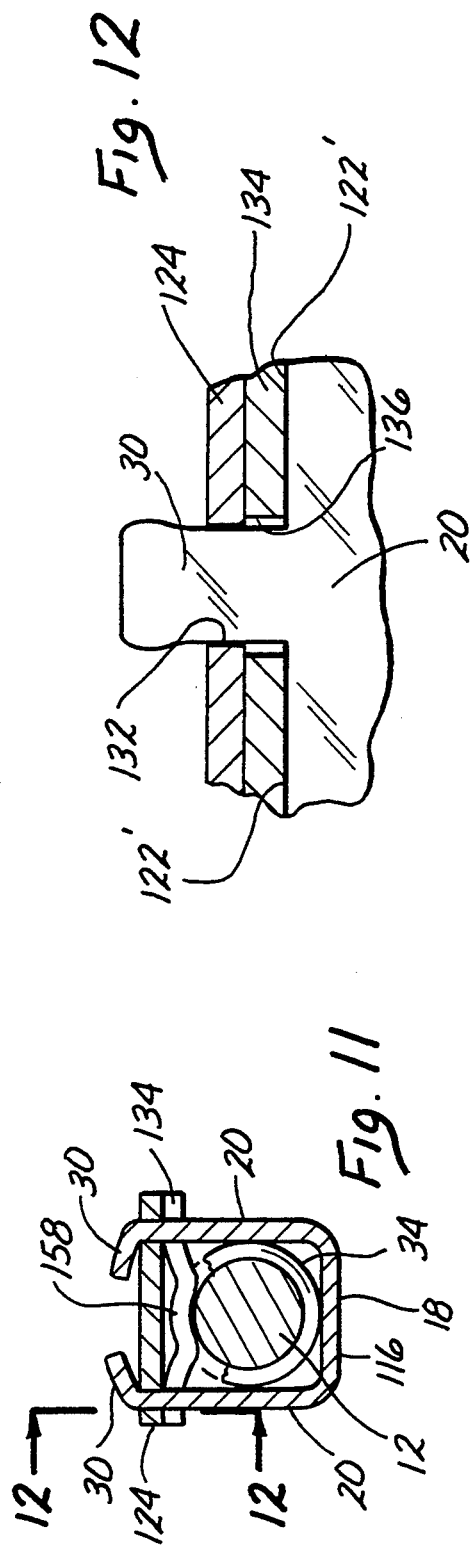

PRECISION LINEAR MECHANICAL LOCK

RELATED APPLICATIONS

This is a continuation-in-part of application Ser. No. 08/074,041, filed Jun. 8, 1993, now pending.

BACKGROUND OF THE INVENTION

1. Field of the Invention

This invention pertains generally to the field of mechanical locking devices of the type having a rod normally locked against axial movement through a lock housing by a clutch spring of reduced diameter, where the rod is released by partially unwinding the spring.

2. State of the Prior Art

The device of this invention pertains to a class of mechanical locks which generally have a rod axially movable through a lock housing, one or more coil springs tightly wound about the rod and axially fixed to the housing so as to normally grip the rod against movement through the housing. A release is provided for partially unwinding the coil spring or springs such that the internal diameter of the spring is increased and the rod is released for axial movement relative to the lock housing. Linear locks of this type have been in widespread use, particularly in recliner seats used in automobiles and other vehicles. In such installations, the housing of the mechanical lock is attached to one of the reclinable backrest or the stationary seat, while the end of the rod is connected to the other of those two seat components. In its normally locked condition the device fixes the position of the backrest. If the occupant desires to reposition the backrest, the lock is manually released, which frees the rod and allows movement of the backrest. The mechanical lock typically has a heavier exterior coil spring which returns the rod to an extended condition when the lock is released. For example, the spring may serve to bring the seat backrest to a fully upright condition. One relatively early example of such a lock is disclosed in U.S. Pat. No. 3,874,480 issued to Porter et al. and owned by the Assignee of this patent application.

In applications where bi-directional loading of the rod is anticipated, two springs may be provided, one on each side of a common release lever and axially contained between two end bushings, each bushing engaging an end tang of a corresponding spring to fix the tang and the outer end coils of the spring against rotation about the rod. The inner end coils of the springs are connected to a release lever, actuatable for simultaneously unwinding both springs to free the rod for axial movement through the housing.

The bushings serve three distinct functions. An axial bore in each bushing defines a radial bearing surface which supports the rod for sliding movement through the lock housing. A radial slot in the bushing receives an end tang of the spring, to circumferentially fix the outer end of the spring and prevent this end of the spring from turning about the rod. Finally, an axial bearing surface on the bushing is circumferentially spaced by 90 degrees from the spring tang. When the spring is pulled with the rod against the axial bearing surface by a load acting on the rod relative to the lock housing, the end coils of the spring are canted relative to the rod axis. This canting deforms the coils from a normal circular shape to an ellipsoid shape, and substantially increases the frictional engagement between the spring coils and the rod. The clutch spring better resists the load and makes for a more positive lock of the rod relative to the housing so long as the loading condition persists.

Prior art locks also feature a tubular sleeve which closely envelops the spring or springs, to prevent the coils from unwinding preferentially at the release lever while the coils at the opposite end remain in a rod gripping condition. The sleeve prevents this result by distributing the unwinding action more evenly along the length of the spring so that all coils release the rod at substantially the same time, for positive, quick release action of the lock.

Early locks of this type were housed in a cylindrical tube open at one or both ends. The clutch spring was mounted on the rod, and other components such as end bushings, actuator levers, etc. all were assembled onto the rod and then inserted into the housing. The housing wall was then swaged or welded to hold the internal components in axially fixed position within the housing. The relative positions of the lock elements in the housing is rather critical and a high degree of precision must be maintained in assembling the lock. A tube type housing makes this objective difficult to achieve with consistency.

More recently, the tube style housing has evolved into a two-piece clam shell housing, described in European patent application number 85201888.6 filed Nov. 18, 1985, Publication number 0 182 440 83. An envelope or housing is formed by two half-shells. The rod is first fitted with the two coil springs, a release lever including a containment sleeve about the springs, and a pair of end bushings which engage the ends of the coil spring. The half-shells are mated to each other with the rod assembly in-between, and welded to the bushings to form an enclosure about the rod. The axial spacing between the bushings is fixed by this welding, with springs axially contained between the bushings. The rod slides through the bushings and the housing when the spring is unwound to permit such movement.

The need to weld bushings to a lock housing has been a source of difficulty in prior art locks. In practice, it is very difficult to produce locks with welded bushings which are perfectly aligned with the rod axis, and such misalignment introduces a degree of frictional drag into the lock mechanism. In addition, the bushings add significantly to the cost of the lock, and may have to be differentially hardened to provide hard bearing surfaces as well as untreated portions which can be welded.

U.S. Pat. No. 5,157,826, commonly owned with this application, describes a method for making a linear mechanical lock in which the number of component parts is reduced by fabricating the lock housing from a single sheet of metal and embossing various elements, which previously constituted separate parts, into the single sheet. In particular, the interior dimension of the housing is such as to closely encompass the clutch springs to promote even unwinding of the spring along its length upon actuation of the lock release without a separate containment sleeve. While this prior invention represents a substantial contribution to the state of art, further improvements have been made which facilitate fabrication and assembly of the linear lock while at the same time improving the precision of the lock assembly for smoother, easier and faster lock operation.

SUMMARY OF THE INVENTION

The mechanical lock of this invention has two housing elements which are assembled to make up a tubular lock housing. Two coil springs are wound coaxially on a rod extending through the housing. The springs are axially contained between two opposite axial bearings provided on only one of the housing elements, and the springs have a normal inside coil diameter sized for clutching the rod against axial movement through the housing. The springs have inner ends connected to a release and outer ends with tangs circumferentially fixed to the other of the two housing elements. The release may take the form of a release lever rotatable about the rod between the springs so as to simultaneously partially unwind the end coils of both springs to an enlarged inner diameter. The housing is internally sized to closely encompass the spring between the axial bearings so as to limit the enlarged diameter of the end coils and transmit the slack caused by the unwinding at one end of the coil spring along the length of the spring, thereby to achieve fast and positive release of the rod in response to actuation of the release.

One or both of the axial bearings are adjustable for reducing free play of the spring along the rod. The adjustable axial bearing may be a rotatable eccentric cam which engages an outer end coil of the spring, and can be manually turned to urge the spring coils against an opposite axial bearing to remove free play along the spring and ensure good positive contact of the spring at both ends with the respective axial bearings. The eccentric cam may be on the inner end of a rotatable plug fitted in an opening in the lock housing, the exterior end of the plug being slotted and externally accessible by bladed tool, such as a screwdriver for turning the plug. Following adjustment, the end bearing element may be fixed in position by adhesive bonding to the lock housing.

The linear lock is normally installed between two load elements which are movable relative to each other. This installation is by first and second load connectors on the housing and the rod respectively. The housing load connector is provided only on one of the housing elements, which is the same housing element which carries the axial bearings. The other housing element is not directly connected to the load and only holds the spring tangs against turning. One of the housing elements is therefore a load bearing element which carries most or nearly all of the working load of the lock, and the second, non-load bearing housing element is relatively lightly loaded. This novel arrangement makes it possible to use lighter materials for the second housing element, thereby realizing significant savings in the overall weight of the lock. Further, since heavy loads need not be shared by the housing elements they can be fastened together by purely mechanical means without resort to welding, allowing a wider choice of materials for the housing elements since compatibility with welding processes is no longer required.

In a presently preferred form of the invention, the non-load bearing housing element is a length of U-shaped channel stock of U-shaped cross section with a bottom between two sides and one open side. Openings in the bottom receive and hold the end tangs of the clutch spring in a circumferential direction relative to the lock housing. The load bearing housing element has a base plate which is attached to the channel and closes the open side of the channel to form a tubular enclosure of generally rectangular interior cross section about the rod and the clutch springs. When the release is actuated to enlarge the clutch spring diameter and release the rod the outer circumference of the clutch springs contacts all four sides of the housing. The spacing between the interior surfaces of the housing, and the outer diameter of the clutch spring in the normal condition of the lock, is small so that the outer diameter of the clutch spring is limited upon unwinding and the slack induced by the release is quickly transmitted along the length of the spring for fast release of the rod.

The load bearing housing element preferably has a mounting for a release actuator, such as a manually operated handle which upon turning actuates the release of the lock, or a cable release for remote actuation of the lock release. The mounting may be integral with the housing element and also integral with the load connector on the same housing element.

A presently preferred manner of assembling the housing elements is by tabs on the longitudinal edges of the channel element along the open side. The tabs mate into aligned slots in the load bearing housing elements, and are bent to make a simple mechanical interlock to secure the two housing elements to each other.

In an alternative form of the invention, the axial spacing between the axial or end bearings acting on the opposite ends of the coil springs is adjustable by providing the end bearings on two separate load bearing housing elements which are assembled to a non-load bearing housing element. At least one of the load bearing housing elements is positionably adjustable in relation to the other two housing elements in a partially assembled, unfinished condition of the lock housing for ensuring positive engagement between the spring end bearings with the corresponding ends of the coil springs, thereby to remove any spacing which might permit free play of the springs and rod in an axial direction between the end bearing elements. The three housing elements may be assembled and fixed together by a simple mechanical interlock, such as crimpable tabs on one housing element passing through aligned slots in the other two housing elements. In particular, an adjustable load-bearing housing element may receive the crimpable tabs in slots of enlarged size in the direction of the rod, allowing this element to be adjustably positioned prior to crimping of the tabs.

Of the three housing elements, a non load bearing first housing element, serving as a housing bottom, may be a channel of U-shaped cross section open at opposite ends and along one side between parallel edges from which extend a number of crimpable tabs. A load bearing second housing element may be a top plate slotted for receiving the tabs on the first housing element. A load bearing third housing element may be an adjustment plate, also slotted for receiving the tabs of the first housing element. The slots in the third housing element, however, may be longer than the width of the tabs, so as to permit limited positional adjustment of the third housing element along the edges of the housing bottom. The top plate may be mated to the tabs in overlying relationship with the adjustment plate, so that the adjustment plate is interposed between the first and second housing elements. Once the three housing elements are so assembled, and while the tabs are in an initial uncrimped condition, the adjustment plate can be positionally adjusted by pushing it towards the end bearing on the top plate, so as to bring the two end bearings tightly against the opposite ends of the coil springs to remove any axial free play of the rod and coil relative to the housing assembly. The tabs of the housing bottom are then bent or crimped over the second housing element, thereby fixing all three housing elements in a fully assembled condition of the mechanical lock. In particular, the adjustment plate is frictionally retained and fixed in place between the first and second housing elements in this fully assembled condition. The spring end bearings are preferably integrally formed with the second and third housing elements of sheet metal. Desirably, a fail safe interlock is provided between the second and third housing elements to prevent catastrophic failure of the lock in the event that sufficient axial overload of the lock mechanism overcomes the frictional lock and also shears the tabs which retains the adjustment plate to the other lock housing elements. This fail safe interlock may include a window opening in the adjustment plate and a detent extending from an overlying portion of the top plate into the window opening to provide a mechanical stop against an edge of the window opening in the event of displacement of the adjustment plate.

These and other improvements, features and advantages of this invention will be better understood by reference to the following detailed description of the preferred embodiments and the accompanying drawings.

BRIEF DESCRIPTION OF THE DRAWINGS

FIG. 1 is a perspective view of a linear mechanical lock according to this invention, equipped with a remote cable release which is shown in phantom lining;

FIG. 2 is a longitudinal section of the lock taken along line 2—2 in FIG. 1;

FIG. 3 is a cross sectional view taken along line 3—3 in FIG. 2;

FIG. 4 is a top view taken partly in section to expose the adjustable eccentric cam at one end of the clutch spring, the cam being shown at minimum engagement with the spring prior to adjustment;

FIG. 5 is a view as in FIG. 4 with the eccentric cam adjusted to take up axial play in the clutch spring;

FIG. 6 is a perspective view as in FIG. 1 with the lock equipped for installation of a manual handle release in lieu of the remote cable release shown in phantom lining in FIG. 1;

FIG. 7 is an end view partly in section along line 7—7 in FIG. 6;

FIG. 8 is a perspective view of an alternative embodiment of the linear mechanical lock;

FIG. 9 in an exploded perspective view of the lock of FIG. 8, showing the three housing elements which together make up the lock housing;

FIG. 10 is a longitudinal section of the lock housing taken along line 10—10 in FIG. 1, showing the coil springs closely held between the spring end bearings on the lock housing;

FIG. 11 is a transverse section of the mechanical lock taken along line 11—11 in FIG. 10, showing in end view the spring end bearing of the adjustment plate of the lock housing; and FIG. 12 is a detail view showing one of the tabs of the housing bottom passing through aligned slots in the top plate and adjustment plate, illustrating the oversized dimension of the slot in the adjustment plate and close tolerance of the slot in the overlying top plate.

DETAILED DESCRIPTION OF THE PREFERRED EMBODIMENTS

With reference to the drawings, the linear mechanical lock of this invention, generally designated by the numeral 10, has a cylindrical rod 12 which extends into a tubular lock housing 14. The lock housing 14 has a bottom, non-load bearing element 16, and a top, load bearing element 24. The two housing elements 16, 24 are assembled to make a tubular housing which is open at opposite ends. The bottom part 16 is a length of channel stock which, as seen in the cross sectional view of FIG. 3, has a bottom 18, two sides 20, and an open side between upper edges 22. The top part 24 is also U-shaped in cross section with a base 26 between side portions 28. Tabs 30 along the upper edges 22 of the channel 16 mate into aligned slots in the base 26 of the top housing element, and are bent so as to mechanically interlock the channel 16 to the underside of the base plate 26, closing the open side of the channel 16. The resultant housing assembly 14 has a nearly rectangular interior cross section, as seen in FIG. 3.

A pair of clutch springs 32, 34 are wound axially about the rod 12 in opposite senses to each other and have a normal internal diameter slightly smaller than the rod diameter, so that both springs grip the rod tightly. The outer ends of the clutch springs 32, 34 terminate in tangs 36, 38, respectively. The tangs are circumferentially fixed relative to the housing 14 in slots 40, 42 defined in the bottom 18 of the channel 16. The inner ends of the clutch springs 32, 34 are engaged in notches 44 of a sleeve 46 which is coaxial with and rotatable about the rod 12 by means of release lever 48. The lever 48 extends through a window 50 in the base plate 26 and is urged against one of the side portions 28 by the tension of springs 32, 34 acting on the sleeve 46.

The clutch springs 32, 34 are axially contained between opposite axial bearings, One axial bearing is a fixed shoulder 52 integral with the base plate 26. The other axial bearing is an eccentric cam 54 fixed to the inner end of a plug 56 which is rotatable in an opening 58 in the base plate 26, as shown in FIG. 2. The axial bearings 52, 54 engage the outer end coil of a corresponding clutch spring 32, 38 at a point diametrically opposite to the end tangs 36, 38. FIG. 4 shows the adjustable axial bearing in plan view with the base plate 26 removed for clarity. The outer end 58 of plug 56 has a slot 74 engageable by a bladed tool, such as a screwdriver, for turning the plug 56 in hole 58. Rotation of the plug 56 turns the eccentric cam between a minimum radius engagement with the end coil of clutch spring 34, shown in FIG. 4, and a maximum radius engagement, seen in FIG. 5, along the circumference of the cam 54.

In a normal condition of the linear lock 10, the clutch springs 32, 34 lock the rod 12 against axial movement through the housing 14. The rod 12 is released for axial movement by turning release lever 48 and sleeve 46 counterclockwise as indicated by the arrow in FIGS. 2 and 3. The sleeve 46 simultaneously turns the inner ends of both clutch springs in a sense which unwinds the spring coils, enlarging their inner diameter. The interior dimensions of the lock housing, between the inner surfaces of the sides 20, and between the bottom 18 and base plate 26, are only slightly greater than the normal outside diameter of springs 32, 34, so that the housing 14 closely encompasses the clutch springs. As release lever 48 begins to turn, the inner end coils of the two springs unwind and their outer diameter enlarges only slightly before their expansion is limited by contact with the interior surfaces of the channel 16 and the base plate 26. Continuing movement of release lever 48 is transmitted to successively adjacent coils from the outer ends of the springs towards the inner end coils as the expansion of each successive coil is limited by the closely adjacent-interior surfaces of the lock housing 14, ultimately resulting in the enlargement of all the coils of both springs, releasing the rod 12 for axial movement through the housing 14.

The upright side portions 28 of the housing top 24 are shaped and perforated to provide two mounting lugs 60 which together constitute a first load attachment point for the lock 10. A second load attachment point is provided by a perforated mounting lug 62 at the end of rod 12. *** The lugs 60 on the housing are close to the base 26 of the housing top 24 so as to place the load vector connecting the two load attachment points into near alignment with the rod 12. The working loads on the lock 10, whether tension or compression loads, are transmitted from one load component to the lugs 60 on the housing, through the axial bearings 52, 54 to the clutch springs which act axially on the rod 12 and ultimately to the other load component connected to the rod end. The approximate alignment of the load vector with the rod and spring axis minimizes load transfer from the top housing element 24 to the bottom housing element 16. The working loads of the lock 10 are therefore primarily carried by the top housing element 24. Since the attachment lugs 60 are not quite on-axis with the rod, some lateral loading of the housing 14 relative to the rod 12 and springs 32, 34 may occur, in which case some fraction of the total working load will be transmitted to the housing bottom 16. The loads on the channel 16, however, will be small as compared to the loading on the housing top 24. For this reason, the housing top 24 may be properly considered to be the load bearing element of the housing, while the housing bottom or channel 16 is referred to as the non-load bearing element of the housing.

In a preferred form of this invention the rod 12 is supported in the housing 14 only by the clutch springs 32, 34, obviating the rod bearing surfaces provided by bushings in prior art linear locks. In many applications, the clutch springs will suffice to support the rod in axial alignment through the lock housing, particularly if the load attachment to the housing is made close to the rod axis, so that the loading on the lock mechanism is as nearly as possible aligned with the axis of the rod, and the axial load is largely taken up by the axial bearing elements 52, 54. While some torsional or lateral loading on the housing 14 relative to the rod 12 may still occur, such loading is adequately carried by the clutch springs without unduly affecting the operation of the lock. Where particularly heavy working loads are to be carried by the lock 10, rod bearing surfaces may be provided integrally with one or both of the housing elements 16, 24, near one or both ends of the housing 14, by for example embossing or otherwise deforming inwardly the housing elements at selected points.

Because of the large difference in load bearing requirements, the housing top 24 can be made of high strength material such as steel, while the channel 16 can be of lighter, lesser strength material such as aluminum. The possibility of using different housing materials in this manner permits significant reductions in the overall weight of the lock 10. This is an important consideration in vehicular installations, such as automotive and aircraft seating, which are typical applications for these linear locks. Both housing elements 16, 24 can be fabricated of sheet stock at low cost by stamping methods.

Yet another important advantage of this lock housing structure is that the housing elements 16, 24 can be fastened together by simple mechanical means without resort to welding, which in turn permits a wider choice of materials for the housing elements since compatibility with welding processes is no longer required. The load bearing capacity of the integral fixed axial bearing 52 may be enhanced by heat treatment of the housing top 24 for greater hardness. The mechanical interlock between the housing components 16, 24 allows such hardening, since welding of the two components is unnecessary.

Additionally, the housing components of the lock of this invention can be coated by various processes for corrosion resistance where the lock 10 is to be used in environmentally adverse conditions, as sell as for improved esthetic appearance for greater customer acceptance. The coating may be by various plating and painting processes, which were impractical in prior art mechanical locks repairing welding, since plated or painted components cannot be easily welded and post-assembly plating or painting is impractical.

The upright sides 28 also have mounting lugs 62 for optional left or right side mounting of a cable release CR, shown in phantom lining in FIG. 1, for remote actuation of the release lever 48. The cable release is conventional, and has a sleeve which is anchored at its end to one of the mounting lugs 62, and a cable slidable within the sleeve which is attached to the outer end of the release lever 48. Pulling on the cable relative to the sleeve at a remote end of the cable release CR actuates the lever 48 for unwinding the clutch springs 32, 34 and freeing the rod 12 for axial movement through the lock housing.

The upright sides 28 further have alternate release mountings 64 for optional right or left hand side mounting of a handle release actuator shown in FIGS. 6 and 7, where the release lever 48' has a modified, curved shape, best shown in FIG. 7. A handle mounting shaft 66 is supported between the two mounting 64. An actuator finger 68 extends generally radially from the shaft 66. Turning the shaft 66 as indicated by the arrow in FIG. 7, causes the release finger 68 to lift a transverse intermediate portion 70 lifting and turning the release lever 48 towards the left in FIG. 7 as indicated by the arrows. The inner end of the modified release lever 48' is attached to a sleeve 46, as shown in FIG. 2. A stop finger 72 is fixed radially to the shaft 66 and is generally diametrically opposite to the release finger 70. The stop finger moves downwardly as the release finger 68 moves up against the release lever 48' until the stop finger 72 comes against the base plate 26, stopping further rotation of the shaft 66, to prevent excessive force against the release lever 48'.

Assembly of the mechanical lock 10 is simple and quick. The clutch springs and the sleeve 46 of the release lever 48 are fitted onto a rod blank which is then worked to make either or both the end lug 62 and an upset 76 at the opposite end of the rod of sufficient diameter to serve as a stop against withdrawal of the rod from the housing 14. This subassembly is then placed into the channel 16, with the end tangs 36, 38 in their corresponding slots 40, 42 in the bottom of the channel. The housing top 24 is then mated to the tabs 30 of the channel 16, so that the clutch springs 32, 34 lie axially between the axial bearings 52, 54. The two housing elements 16, 24 are then fastened together by staking the tabs 30 on the upper side of the base 26. At this point in the assembly sequence a degree of axial slack or free play between adjacent coils of the clutch springs will typically exist, as illustrated by the slight spacing between the end coils of the spring 34 in FIG. 4. This free play is removed by adjustment of the axial bearing 54, accomplished by turning the plug 56. Rotation of the cam 54 with the plug 56 continuously varies the axial position of the contact point between the eccentric camming edge of the cam 54 and the end coil of the clutch spring 44. By turning the cam 54 between the minimum engagement position of FIG. 4 and the maximum engagement position of FIG. 6, a cam position will be found where the coils of both clutch springs 32, 34 are closely adjacent without free play in an axial direction, yet without excessive tightness or friction between the coils which would impede response to the release lever 48. Adjustment of the cam 54 operates to urge the coils of the clutch spring 34 towards the opposite axial bearing 52. During this adjustment procedure, the sleeve 46 of the release lever is free to move axially on the rod 12 under the urging of the cam 54 transmitted through the clutch spring 34. Once the cam 54 is adjusted, the plug 56 is fixed against subsequent rotation by application of a suitable permanent adhesive between the plug and surrounding portions of the lock housing. Where particularly heavy working loads are anticipated, greater than can be satisfactorily carried by the fixed bearing shoulder 52, the mechanical lock 10 can be modified by replacing the fixed axial bearing 52 with a second adjustable axial bearing similar to the plug 56 with eccentric cam 54.

In some applications, it may be desirable to provide a relative large external spring 82 compressed between the lock housing 14 and the rod 12, as shown in FIG. 6, to continuously bias the rod 12 to an extended position relative to the lock housing. For that purpose, a spring stop 78 is formed by curling a strip cut from the bottom 18 of the channel 16, as shown in FIG. 2. The spring stop 78 is axially aligned with edges 80, which cooperate with the spring stop 78 in supporting the inner end of the external coil spring 82. The opposite, outer end of the coil spring 82 is supported by a stop element 84 on the rod 12.

An alternate embodiment of the present invention will be described with reference to FIGS. 8 through 12, wherein the mechanical lock 100 differs from the earlier described lock 10 of FIGS. 1 through 7 in the mechanical arrangement for making the fine positional adjustment of the spring end bearings so as to remove any free axial play (known as "shucking") of the spring/rod subassembly within the lock housing. Common elements of the lock 100 with the previously described lock 10 are designated by common numerals. The lock 100 has a lock housing 114 which is assembled from three housing elements. A first housing element is a bottom 116 which is a length of channel stock of U-shaped cross section, as seen in FIGS. 2 and 4. The housing bottom 116 has a bottom 18 and two sides 20 which extend between open opposite ends and an open side between upper edges 122. A second housing element is a top plate 124 which in part is U-shaped with side portions 28. The side portions 28 are integral with the top plate 124 and define two mounting lugs 60 which together constitute a first load attachment point for the lock housing 114, as well as mounting lugs 64 for optional left or right side mounting of a cable release as has been explained in connection with the lock 10 above.

The housing bottom 116 has ten rectangular tabs 30, five spaced along each edge 122, and which in an initial condition of the housing bottom 116 extend upwardly from the edges 122 in a common plane with each side 20. The top plate 124 has slots 132 which are sized and aligned to closely receive each of the tabs 30. The dimensions of the slots 132 are such that the top plate 124 is fixed by the tabs 30 against movement in the direction of the rod 12 along the edges 122 of the housing bottom. The top plate 132 has a first spring end bearing 152 which is formed, for example, by stamping and bending a portion 154 of the top plate, to form an edge 152 which is contoured to the curvature of the rod 12, so as to act as a stop for the outer end coil of the spring 32, on the left hand side in FIG. 10. The end bearing 152 stops the rod and spring assembly from axial displacement towards the left in FIG. 10 while the springs 32, 34 are in their normal rod gripping condition of reduced diameter.

A third housing element is an adjustment plate 134 which has four slots 136 arranged for receiving four corresponding tabs 30 on the housing bottom 116, specifically, the four tabs 30 at the right hand end of the housing bottom 116 in FIGS. 9 and 10. The adjustment plate 134 has an edge 158 shaped to the contour or curvature of the rod 12, so that a center portion of the shaped edge lies against the surface of the rod 12 and follows the rod curvature over a portion of the rod circumference to form a second spring end bearing 158. The second end bearing 158 acts as a stop against the outer end coil of the spring 34, to stop the spring and rob sub-assembly against axial movement towards the right in FIG. 10. The two springs 32, 34 are consequently axially captive between the two end bearings 152, 158, and in their normal rod gripping condition, lock the rod 12 against axial movement through the lock housing 114.

The upper edges 122 of the housing bottom are offset at segments 122', on both sides 20 of the housing bottom, to accommodate the thickness of the adjustment plate 134 when the adjustment plate is mated to the tabs 30, so that when the adjustment plate is assembled to the housing bottom, the top surface of the adjustment plate is flush with the edges 122. The top plate 124 is assembled to the housing bottom 116 in overlying relationship to the adjustment plate 134, as shown in FIG. 10. The slots 132 of the top plate 124 receive all ten of the tabs 30 of the housing bottom, including those four tabs 30 which pass through the slots 136 of the adjustment plate 134.

The slots 136 of the adjustment plate 134 are wider than the tabs 30 which mate into those slots, in order to permit a small, limited positional adjustment of the plate 134 along the edges 122' in the direction of the rod 12. In a partially assembled condition of the lock 100, the three housing elements 116, 134 and 125 are assembled to the rod and spring sub-assembly but the tabs 30 remain in their initial straight condition illustrated in FIG. 9. An axially directed force, indicated by arrow F in FIG. 10, is then applied to the adjustment plate 134 in order to urge the end bearing 158 against spring 134, thereby also axially displacing the rod and coil subassembly until the outermost coil of the spring 32 makes positive engagement with the opposite end bearing 152. This ensures that both end bearings 152 and 158 are in positive contact with the opposite ends of the spring assembly 32, 34 so that the springs are held tightly in an axial direction to the lock housing 114. This in turn ensures that the rod 12 is firmly held to the housing 114 without any free play of the rod which would detrimentally affect the performance of the lock 100 in a load bearing installation.

Assembly of the lock 100 is completed by bending all of the tabs 30 against the upper surface of the top plate 124 to a crimped condition shown in FIGS. 8, 10, 11 and 12. The crimped tabs 30 form a mechanical interlock which holds together the three housing elements and fixes both plates 134, 124 against movement relative to the housing bottom 116. In particular, the crimped tabs 30 fix the adjustment plate 134 in frictional engagement between the bottom 116 and top plate 124 to secure tight engagement of both end bearings with the corresponding spring ends.

As described above in connection with the lock 10, the housing bottom 116 of the lock 100 is substantially non-load bearing, as the axial load acting on the lock 100 is transmitted by the rod 12, through springs 32, 34 onto the end bearings 152 and 158 and thus onto the plates 124, 134 and ultimately to the load mounting lugs 60 of the lock housing. The two plates 124, 134 of lock 100 in effect take the place of the single top plate 26 of the lock 10.

A fail safe interlock is provided to prevent failure of the lock 100 in an overload condition of the lock in the unlikely event that an axial force pulling on rod 12 relative to the lock housing 114 is of sufficient magnitude to overcome the frictional engagement of the adjustment plate 134 with the top plate 124 and housing bottom 116 and also to shear the four tabs 30 mated to the adjustment plate. This interlock includes a portion 140 which is bent away from the top plate 124 and into a window 142 defined in the adjustment plate 134, presenting a detent edge 144 against the edge of the rectangular window 142 which is adjacent to the end bearing 158, as best understood by reference to FIGS. 9 and 10. The detent edge 144 stops the plate 134 from moving more than a small distance in an axial direction away from the spring 34 in case of an overload condition, and thereupon transfers a substantial portion of such an overload to the top plate 124 which in turn distributes the load over all ten of the tabs 30, thus preventing possible failure of the lock.

From the foregoing it will be appreciated that the adjustment of the plate 134 provides a simple, low cost means for achieving a high degree of precision in assembly and subsequent operation of the lock 100 with easy to manufacture sheet metal components for the lock housing.

While a presently preferred form of the invention has been described and illustrated for purposes of clarity and example only, it will be better understood that many changes, substitutions and modifications to the described embodiments will become readily apparent to those possessed of ordinary skill in the art without thereby departing from the scope and spirit of the present invention which is defined in the following claims.

What is claimed is:

1. A mechanical lock comprising:
a lock housing having a plurality of housing elements, a spring end bearing on different ones of said housing elements, a rod, coil spring means wound on said rod, said spring means having a reduced normal diameter for tightly gripping said rod, said spring means being axially contained between said end bearing means thereby to hold said rod against axial displacement through said housing, said spring means having opposite ends circumferentially fixed to said housing, deformable means on one of said housing elements insertable through corresponding openings in the others of said housing elements, said deformable means allowing relative positioning of said housing elements in an inserted but undeformed condition of said deformable means for adjusting said end bearing means into positive engagement with opposite ends of said spring means, all said housing elements being fixed relative to each other in a deformed condition of said deformable means, and means for partially unwinding said spring means to thereby release said rod for axial movement through said housing.

2. A mechanical lock comprising:
a lock housing having a first and second plates, a rod, each of said plates having a curved edge portion conforming in a circumferential direction to said rod, coil spring means wound on said rod, said spring means having a reduced normal diameter for tightly gripping said rod, third housing means attached to one side of said plates for retaining said rod with said coil to said plates in a direction transverse to said rod, each said edge portion engaging an opposite end of said spring means thereby to hold said rod against axial displacement through said housing in a normal condition of said spring means, said spring means having opposite ends circumferentially fixed to said housing, tabs on said third housing means insertable in a direction transverse to said rod through corresponding openings in said plates, said plates being movable relative to each other in an inserted but undeformed condition of said tabs for adjusting said edge portion of each of said plates into positive engagement with said opposite end of said spring means, said plates being fixed relative to each other and said third housing means in a deformed condition of said tabs, and means for partially unwinding said spring means to thereby release said rod for axial movement through said housing.

3. The mechanical lock of claim 2 wherein said plates have mutually overlapping portions and said plates are slidable against each other in said engaged but undeformed condition of said tabs.

4. The mechanical lock of claim 2 wherein said plates are substantially planar and said edge portions are curved transversely to said plates.

5. A mechanical lock comprising:
a lock housing having first and second plates, a spring end bearing on each of said plates, a rod, coil spring means wound on said rod, said spring means having a reduced normal diameter for tightly gripping said rod, third housing means attached to one side of both said plates for retaining said rod with said coil to said plates in a direction transverse to said rod, said spring means being axially contained between said end bearing means thereby to hold said rod against axial displacement through said housing, said spring means having opposite ends circumferentially fixed to said housing, deformable means mateable for fixing together said plates and said third housing means, said deformable means allowing limited relative movement of said plates in the direction of said rod in a mated but undeformed condition of said deformable means for adjusting said end bearing means into positive engagement with opposite ends of said spring means, said plates being fixed relative to each other in a deformed condition of said deformable means, and release means operable for partially unwinding said spring means to thereby release said rod for axial movement through said housing.

6. The mechanical lock of claim 5 wherein one of said plates is secured to said third housing element by all of said deformable means and the other of said plates is secured to said third housing element by a subset of said deformable means, and further comprising fail-safe means for sharing with said one of said plates an overload acting on the other of said plates in the event of failure of said subset.

7. The mechanical lock of claim 6 wherein said fail-safe means comprise detent means operative for stopping separation of said plates in an axial direction of said housing.

8. The mechanical lock of claim 5 wherein said third housing means comprise a channel element open along one side, said open side being closed by said plates in said mated condition of said deformable means.

9. The mechanical lock of claim 8 wherein said channel element is internally dimensioned for radially limiting Unwinding of said spring means to promote fast unwinding of the spring responsive to said release means.

10. The mechanical lock of claim 5 wherein said end bearing means are edge portions of said plates.

11. The mechanical lock of claim 5 wherein said deformable portions are tabs integral with said third housing means and mateable into openings defined in said plates, said tabs being crimped in said deformed condition.

12. The mechanical lock of claim 5 wherein said edge portions are curved to conform to a curvature of said rod.

13. The mechanical lock of claim 5 wherein said plates overlap each other and are slidable one against the other in said partially assembled condition.

14. The mechanical lock of claim 5 wherein said end bearing means are edge portions curved transversely to said plates.

15. The mechanical lock of claim 5 wherein said end bearing means are on substantially planar portions of said plates.

16. The mechanical lock of claim 5 wherein said deformable means are mateable in a direction transverse to said rod.

17. The mechanical lock of claim 5 wherein said deformable means comprise crimpable portions of said third housing means mateable to receiving openings in said plates, some of said receiving openings being oversized to permit said relative movement of said plates.

18. The mechanical lock of claim 5 wherein only one of said plates is movable relative to said third housing means in said mated but undeformed condition, and further comprising first load connecting means on said only one of said plates and second load connecting means on said rod.

19. The mechanical lock of claim 5 wherein said release means comprises a lever engaged to said spring means between said opposite ends and rotatable about said rod for unwinding said spring means.

20. A mechanical lock comprising:
a U-shaped channel having an open side between upper edges, a rod axially movable through said channel, coil spring means wound about said rod and having end tangs circumferentially fixed to said channel, a top plate and an adjustment plate closing said open side, each of said plates having an integral end bearing engageable to a corresponding end of said spring means for axially fixing said spring means therebetween, a plurality of tabs along said upper edges, said top plate being slotted for receiving said tabs in overlying relationship with said adjustment plate and fixing said top plate against movement along said upper edges, said adjustment plate being interposed between said channel and said top plate, said adjustment plate having slots oversized in the direction of said upper edges for receiving said tabs and permitting limited movement of said adjustment plate along said edges in an uncrimped condition of said tabs to bring said end bearing of each plate into positive engagement with said corresponding end, both said plates being fixed to said channel and against movement away from said positive engagement in a crimped condition of said tabs, said spring means having a normal diameter for locking said rod against movement through said channel, a level engaged to said spring means between said end tangs and rotatable about said rod for partially unwinding said spring means and axially releasing said rod, said lever extending through a window in said top plate.

21. The lock of claim 20 wherein said channel is internally only slightly oversized to the normal outer diameter of said spring means to ensure even unwinding and release of the rod along said spring means upon actuation of said release means.

22. The lock of claim 20 wherein said top plate has integrally formed first load connecting means for securing said housing to a load and control mounting means for mounting lever actuating means, and second load connecting means on said rod.

23. The lock of claim 20 wherein said adjustment plate is secured to said channel by a subset of said plurality of tabs and further comprising detent means on one of said plates engageable with the other of said plates for sharing an overload acting on said adjustment plate in the event of failure of said subset.

24. A mechanical lock comprising:
a lock housing having a channel shaped bottom open at opposite ends and along one side thereof, a first plate and a second plate, a plurality of tabs integral with said bottom mated to slots on said plates for closing said one side, each of said plates having a spring end bearing, a rod axially movable through said housing between said ends, said rod being locked against movement through said housing by coil spring means tightly wound about said rod, said spring means having end tangs circumferentially fixed to said housing, said spring means being axially captive between said end bearings, release means actuatable for partially unwinding said spring means thereby to free said rod for axial movement through said housing, said slots being oversized on said second plate to permit adjustably positioning of said second plate relative to said first plate on said bottom in an initial condition of said tabs for ensuring positive contact of each said end bearing with opposite ends of said spring means, said plates being positionally fixed to each other in a crimped condition of said tabs.

25. The lock of claim 24 wherein said plates at least partially overlap and further comprising fail safe means operative for stopping separation of said plates in the direction of said rod in an overload condition of said lock.

26. The lock of claim 25 wherein said fail safe means comprise an opening in one of said plates and a stop on the other of said plates, said stop projecting into said opening.

27. The lock of claim 24 wherein said tabs are oversized only in a direction parallel to said rod so that said second plate is positionably adjustable only in the direction of said rod in said initial condition of said tabs.

28. The lock of claim 24 wherein said release means comprise a lever engaged to said spring means between said end tangs and rotatable about said rod for unwinding said spring means, and one of said plates is apertured to pass said lever.

29. The lock of claim 24 wherein at least some of said tabs pass through aligned slots in both of said plates.

30. The lock of claim 24 wherein said end bearings are integral portions of said plates formed to define arcuate edges conforming to the circumference of said rod.

31. The lock of claim 24 wherein said bottom has a U-shaped cross-section with parallel free edges along said open side, said tabs extending from said free edges.

32. A mechanical lock comprising:
a lock housing including a first housing element open at opposite ends and along one side between said ends, a second housing element, means for fixing said second housing element to said first housing element for closing said one side, a third housing element between said first and second housing elements, first and second spring end bearings on said second and third housing elements respectively, a rod being axially movable through said housing, said rod being axially locked to said housing by coil spring means tightly wound about said rod, said spring means having end tangs circumferentially fixed to said first housing element, said spring means being axially captive between said end bearings, release means actuatable for partially unwinding said spring means thereby to release said rod for movement through said housing, said third housing element being positionally adjustable in the direction of said rod relative to said second housing element in an initial condition of said means for fixing for ensuring positive contact of said end bearings with opposite ends of said spring means, all said housing elements being fixed against relative movement in a final condition of said means for fixing, wherein said means for fixing comprise crimpable portions of one of said housing elements mateable to receiving openings in the others of said housing elements, some of said receiving openings being oversized to permit said adjustable positioning of said third housing element in said initial condition of said crimpable portions.

33. The lock of claim 32 wherein said third housing element is secured to said first housing element by a subset of said means for fixing and further comprising fail-safe means for sharing an overload acting on said third housing element with said second housing element in the event of failure of said subset.

34. The lock of claim 33 wherein said fail-safe means comprise detent means operative for stopping separation of said second and third housing elements in an axial direction of said housing.

35. The lock of claim 32 wherein said first housing element is a U-shaped channel.

36. The lock of claim 32 wherein said end bearings are integrally formed with said second and third housing elements.

37. The lock of claim 32 wherein said crimpable portions are a plurality of tabs on said first housing element, and said receiving openings are slots on said second and third housing elements, said slots on said second housing element being sized to fix said second housing element to said first housing element in an axial direction of said housing, and said slots in said third housing element are oversized to permit limited movement of said third housing element in an axial direction of said housing in said initial condition, all said housing elements being fixed against relative movement in a crimped condition of said tabs.

38. The lock of claim 32 wherein said second housing element has first load connecting means and said rod has second load connecting means.

39. The lock of claim 32 wherein said release means comprises a lever engaged to said spring means between said end tangs and rotatable about said rod for unwinding said spring means, and one of said housing elements is apertured to pass said lever.

40. A mechanical lock comprising:
a lock housing having a non-load bearing housing element and two load bearing housing elements, crimpable portions of one of said housing elements mated to receiving openings in each of the others of said housing elements, a spring end bearing on each of said load bearing housing elements, at least some of said receiving openings being oversized to permit positioning of said end bearings relative to each other in an uncrimped initial condition of said crimpable portions, said housing elements being fixed against relative movement in a crimped condition of said portions, a rod axially movable through said housing, coil spring means tightly wound about said rod, said spring means having end tangs circumferentially fixed to said housing, said spring means being axially captive between said end bearings, said spring means having a reduced coil diameter for axially locking said rod to said housing in a normal condition of said spring means, and release means actuatable for partially unwinding said spring means thereby to release said rod for movement through said housing.

41. The lock of claim 40 further comprising first load connecting means on one of said housing elements for securing said housing to a first load element, and second load connecting means on said rod for connecting said rod to a second load element moveable relative to said first load element.

42. The lock of claim 40 wherein said housing is internally only slightly oversized to said reduced diameter of said spring means to ensure even unwinding and release of the rod along said spring means upon actuation of said release means.

* * * * *